United States Patent

[11] 3,603,535

| [72] | Inventor | Maurice DePolo<br>37 Schappet Terrace, Lansdowne, Pa. 19050 |
|---|---|---|
| [21] | Appl. No. | 775,300 |
| [22] | Filed | Nov. 13, 1968 |
| [45] | Patented | Sept. 7, 1971 |

[54] LIFESAVING SUPPORT SYSTEM
4 Claims, 3 Drawing Figs.

[52] U.S. Cl. .................................................. 274/121,
280/150 AB
[51] Int. Cl. ...................................................... B64d 25/02
[50] Field of Search ........................................... 244/121;
105/369; 280/150

[56] References Cited
UNITED STATES PATENTS

| 2,275,771 | 3/1942 | Kimbel | 244/125 |
| 3,370,886 | 2/1968 | Frost | 244/121 |
| 2,418,798 | 4/1947 | Whitmer | 244/121 |
| 3,032,298 | 5/1962 | Callahan | 244/119 |
| 3,243,822 | 4/1966 | Lipkin | 244/121 |
| FOREIGN PATENTS | | | |
| 836,748 | 4/1952 | Germany | 244/121 |

*Primary Examiner*—Milton Buchler
*Assistant Examiner*—Steven W. Weinrieb
*Attorney*—John F. A. Earley ABSTRACT: A lifesaving support system comprising inflatible panels positioned on the seats, bulkheads and baggage racks of an airplane or the like. A gas system is provided for inflating the panels with carbon dioxide during takeoff and landing, the inflated panels cushion the shock and thereby protect the passengers in case of a crash or a violent landing.

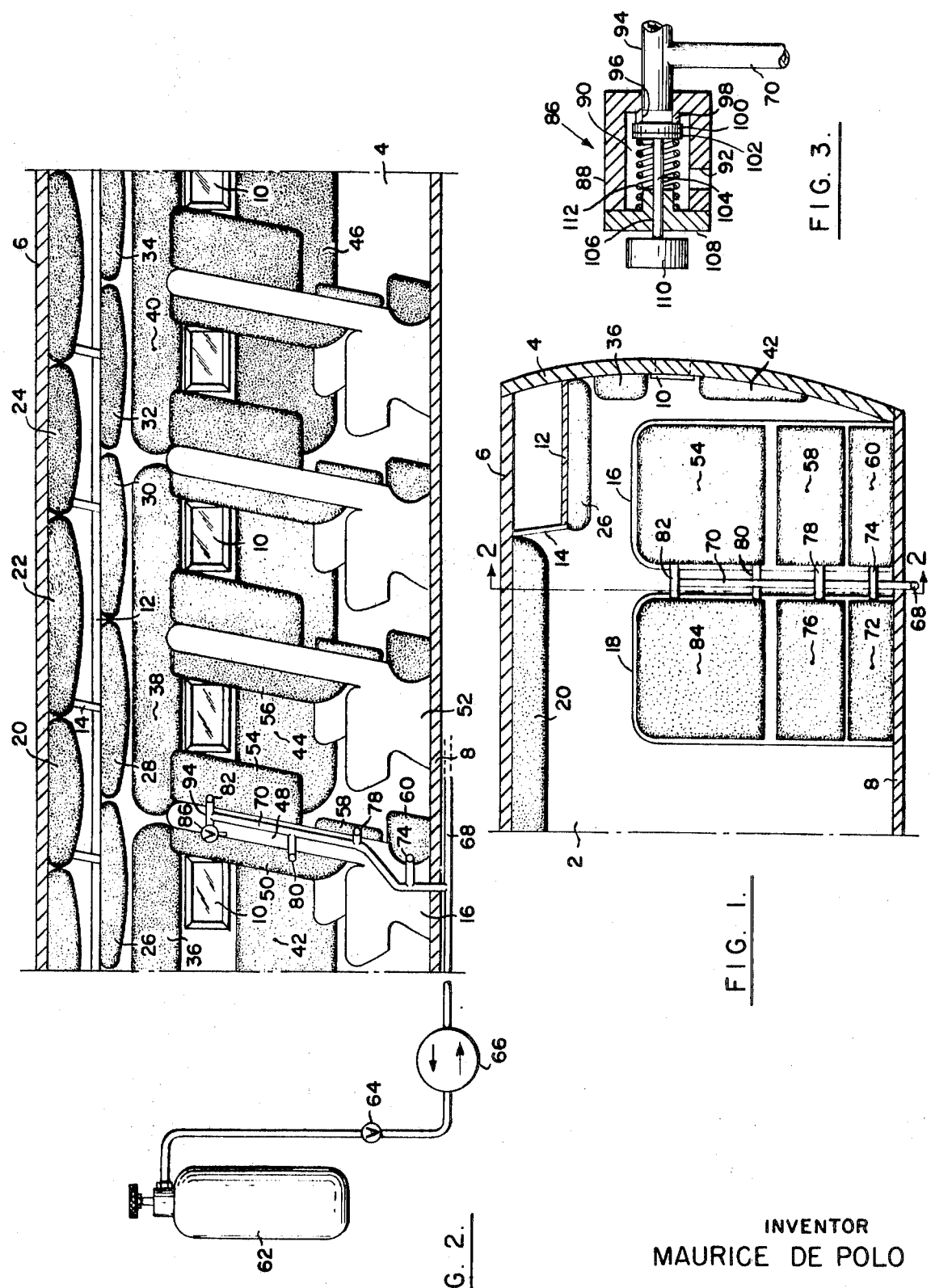

3,603,535

LIFESAVING SUPPORT SYSTEM

BACKGROUND OF THE INVENTION

This invention relates to lifesaving support systems, and particularly to a system for use on passenger airplanes, trains and other high-speed vehicles by which the passengers are protected from injury in the case of a collision or other violent accident.

Presently available statistics show that crashes of airliners, whether they occur during takeoff or landing, or as a result of a malfunction during level flight, are often fatal to all of the passengers. The impact of the crash is likely to cause fatal injuries to the passengers. If they survive the impact, there exists the danger of their being asphyxiated or otherwise killed by a fire of engine fuel which often accompanies a crash.

If an emergency landing is made on a body of water, it is almost inevitable that damage will occur to the airplane such that its fuselage is no longer watertight. As a result, it rapidly fills with water and sinks. If the passengers who have managed to escape are, for some reason, not equipped with life jackets, they will have nothing to support them in the water.

SUMMARY OF THE INVENTION

In accordance with this invention, the various dangers mentioned above are minimized by the provision of inflatable, expansible panels in the interior of the vehicle, positioned in such a way as to provide a maximum degree of protection for the passengers against injury resulting from impact against various objects within the passenger space. In the case of an airplane or airliner, inflatable panels are positioned in front of, and behind each of the passengers. These panels are inflated just prior to the execution of a takeoff or landing, and are deflated at other times in order to allow the passengers to move about comfortably. The panels may also be inflated during an emergency while the airplane is in normal flight. Additional panels are provided along the ceiling and along the walls of the passenger space, these panels remaining in an inflated condition at all times, since they do not interfere with normal movement of the passengers.

The inflatable panels are preferably made from rubber or a stretchable rubberized fabric that, when deflated, take up as little space as possible. The inflatable panels are inflated with a gas such as carbon dioxide or helium, and the panels which remain inflated also contain a gas. If a fire occurs following impact, the panels with which the flames come into contact are broken, releasing carbon dioxide which acts as a flame retardant. In the case of an emergency landing on water, the inflated panels keep the aircraft afloat when the passenger compartment becomes filled with water. Passengers who have escaped to the outside of the aircraft can await help while sitting on the top of the fuselage, since the aircraft remains afloat. Helium filled panels provide a buoyant lifting force.

BRIEF DESCRIPTION OF THE DRAWINGS

FIG. 1 is a vertical section of an airliner fuselage looking toward the nose of the aircraft and provided with inflated and inflatable panels in accordance with the invention;

FIG. 2 is a vertical section taken on the plane 2—2 of FIG. 1; and

FIG. 3 is a vertical section of an impact release valve in accordance with the invention.

DESCRIPTION OF THE PREFERRED EMBODIMENT

Referring to FIG. 1, a passenger compartment 2 is indicated as enclosed by a fuselage sidewall 4, a ceiling 6 and a floor 8. A window 10 is provided in the wall, and a rack 12 is supported from ceiling 6 by support brackets 14. A passenger seat 16 is shown next to the window, and a seat 18 is shown next to seat 16 on the aisle side.

Referring to both of FIGS. 1 and 2, along the ceiling 6 of the passenger space, there are provided inflated panels, three of which are indicated at 20, 22 and 24. These panels extend across the ceiling of the passenger compartment from the rack support brackets 14 on one side to corresponding brackets on the opposite side of the compartment. Ceiling panels 20, 22 and 24 are preferably made from a rubberized fabric, and remain inflated with carbon dioxide at all times. Each is provided with its own valve (not shown), through which it may be inflated during a periodic inspection if it is found that some leakage has occurred. These ceiling panels are provided in a plurality so that, if the aircraft fuselage comes apart as a result of a collision, at least some of the ceiling panels 20, 22 and 24 remain inflated, although those located at the point of the break may be ruptured.

Inflated panels are also provided underneath the racks on both sides of the aircraft. Underneath rack 12, there are indicated inflated panels 26, 28, 30, 32 and 34. Like the ceiling panels, the panels underneath the rack are made from rubberized fabric, and are inflated with carbon dioxide at all times, individual valves being provided for inflation from a gas cylinder.

On the inside of the fuselage wall 4, above the windows 10, inflatable panels including panels 36, 38 and 40 are provided, these panels also being permanently inflated with carbon dioxide. Below the window, permanently inflated panels are indicated at 42, 44 and 46. The panels 36, 38, 40, 42, 44 and 46 above and below the windows 10 protect the passengers against injury resulting from impact with the wall 4 of the fuselage.

Each of the seats is provided with inflatable panels of stretchable, rubberized fabric, the panels being shown in the inflated condition. The inflatable panels on one seat are identical with the inflatable panels on every other seat, and only those provided on seat 16 will be described.

On the forward facing side of the backrest 48 of seat 16 there is provided inflatable panel 50, which extends vertically from the top of the backrest to a position near the bottom. Panel 50 is permanently fastened to the backrest 48, and in its deflated condition, it forms part of the upholstery of the seat. On the rearwardly facing side of backrest 48 extending from the top of the backrest to a level just above the knees of the passenger in seat 52 behind seat 16, there is provided inflatable panel 54, also of stretchable, rubberized fabric. Panel 54 is permanently attached to the rearwardly facing side of backrest 48. Panel 54 is inflatable to an extent such that the space provided between it and inflated panel 56 on the forward side of seat 52 is just sufficient to accommodate a passenger of average size without permitting substantial movement of the passenger in a forward or rearward direction. Below panel 54, an inflatable panel 58 is provided on the rearwardly facing side of backrest 48, panel 58 being located directly in front of the knees of the passenger in seat 52. Below panel 58 and adjacent the floor of the passenger space, there is provided an inflatable panel 60, which protects the feet of the passenger in seat 52.

The inflatable panels on each of the seats are inflated from a central source of carbon dioxide, preferably arranged to be controlled by the pilot or crew member, so that the panels can be inflated just prior to takeoff and just prior to landing, or at any other time protection is deemed necessary.

A gas cylinder containing carbon dioxide is indicated at 62, this cylinder being located at any suitable position aboard the aircraft, and containing sufficient carbon dioxide to inflate under pressure all of the inflatable panels. A valve 64 is controllable to release carbon dioxide from the gas cylinder. A reversible pump 66 is provided on the downstream side of valve 64, and aids the delivery of carbon dioxide to line 68, which extends underneath the floor of the passenger space. Individual lines 70 extend upwardly from line 68, and are located between each of the adjacent pairs of seats. Only one of these vertical lines is shown, this line being between seats 16 and 18 and indicated at 70. Line 70 delivers carbon dioxide from line 68 to each of the four inflatable panels associated with seat 16, and to each of the corresponding panels associated with seat 18. Panel 60 and corresponding panel 72 of seat 18 are connected to line 70 through line 74. Panel 58 and its corresponding panel 76 are inflated through line 78. Panel 50, and its corresponding panel (not shown) on seat 18 are inflated through line 80.

At the upper end of line 70, line 82 provides communication between line 70 and panels 54 and 84. Also connected to line 70, at its upper end is an impact release valve 86, which is shown in detail in FIG. 3.

Impact release valve 86 is provided for the purpose of venting some of the carbon dioxide from within the interior of panels 54 and 84 when an impact occurs in order to protect the passengers in the seats behind these panels by causing the panels to absorb part of the shock of the passenger striking the panel. Valve 86 comprises a cylindrical housing 88 having an interior space 90 and an opening 92. Tube 94, which communicates with the interiors of both of panels 54 and 84 through line 82 (FIGS. 1 and 2) communicates with opening 96 in an end of valve housing 88. Opening 96 extends through a cylindrical boss 98, which acts as a valve seat for a valve disc 100. Valve disc 100 is attached to a metal disc 102, which is, in turn, fixed to a rod 104 slidable in a cylindrical opening 106 in an end member 108. End member 108 closes the end of the housing opposite tube 94. A weight 110 is secured to the end of rod 104 opposite the valve, and a coil spring 112 is arranged to urge valve disc 100 into its closed condition against the valve seat.

This impact release valve 86 is arranged so that rod 104 opens the valve when it moves in the same direction as the direction of forward movement of the aircraft.

The compression of spring 112 and the mass of weight 110 must be so chosen that the valve will remain closed except under the condition of deceleration of the forward movement of the aircraft with such violence that a passenger could be injured. When the aircraft decelerates, the inertia of weight 110 causes it to move in a forward direction, opening the valve for a length of time corresponding to the length of time during which the deceleration exceeds the limit predetermined by the mass of the weight and the spring compression. The force of the passengers' bodies against panels 54 and 84 forces the gas contained within the panels through lines 82 and 94, and through passage 92 of the valve. Gas is released only so long as the deceleration exceeds the predetermined limit and the release of gas from the panels absorbs the shock, and protects the passengers from injury. Some gas is released from panels on the front of the seats, and the knee and foot panels, but this is negligible because the length of line 70 imposes a restriction to the flow of gas from these other panels to the impact release valve 86.

As mentioned previously, the pilot or another crew member can initiate the filling of the inflatable panels with carbon dioxide just prior to takeoff or landing by opening valve 64 and activating pump 66 to operate in a forward direction. In order to permit the passengers to move about comfortably when the aircraft is in normal flight, the inflatable panels must be deflated. This is accomplished without wasting carbon dioxide by operating pump 66 in a reverse direction. Pump 66 then draws gas from the inflatable panels, and repressurizes the gas cylinder 62. Valve 64 can then be closed. One of the advantages of the use of the reversible pump is that a relatively small gas container can be used, and the gas container has to be recharged only infrequently.

The lifesaving support system of this invention provides: maximum individual protection to passengers, buoyancy should a crash occur in water, and a lift to assist in takeoffs and landings when the gas is lighter than air so that shorter runways may be used. If the gas is carbon dioxide or other fire extinguishing gas, the system acts as a fire retardant. The system eliminates passenger responsibility, and provides for automatic or remote control by the pilot, copilot or flight engineer, and the system becomes a regular part of preflight and landing check-off lists.

I claim:
1. A lifesaving support system for use in a transportation vehicle having at least two seats, one being in front of the other, comprising an inflatable, expansible panel adapted to be positioned in said vehicle, a source of gas under a greater than atmospheric pressure, means connecting said source to the interior of said inflatable panel, controllable means for inflating said panel from said source and for deflating said panel, and valve means connected to the interior of said panel for venting the gas within said panel, said valve means being responsive to the deceleration of said transportation vehicle and opening to vent said gas when the deceleration of said transportation vehicle exceeds a predetermined limit.

2. A lifesaving support system for use in a transportation vehicle having at least two seats, one being in front of the other, comprising:
   a plurality of inflatable, expansible panels adapted to be positioned at various locations in said vehicle,
   means for storing a gas under pressure,
   controllable means for delivering said gas from said storing means to the interior of each of said panels to inflate said panels and for pumping gas from said panels into said storing means, and
   control means positioned at a location remote from said panels for operating said controllable means.

3. A lifesaving support system according to claim wherein said gas is carbon dioxide whereby when the panels are punctured the carbon dioxide provides retardation against fire.

4. A lifesaving support system according to claim 2 in which said controllable means comprises a reversible pump.